United States Patent Office 3,202,991
Patented Aug. 24, 1965

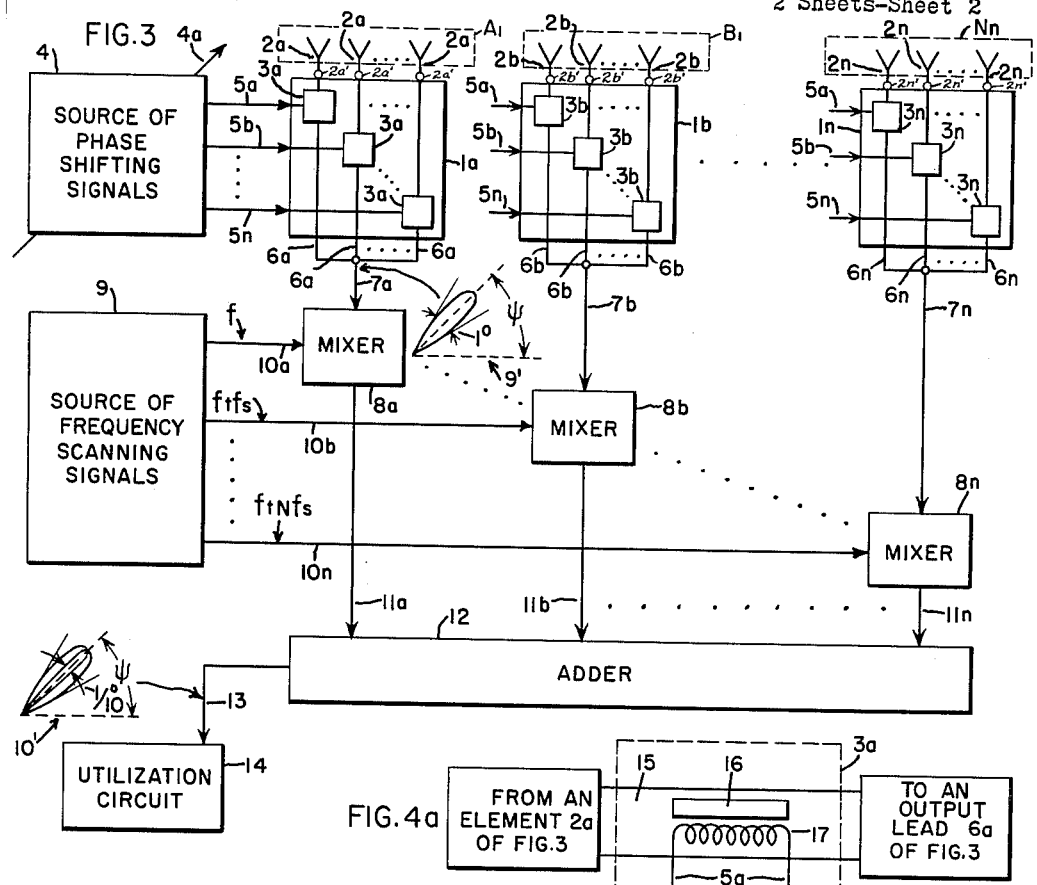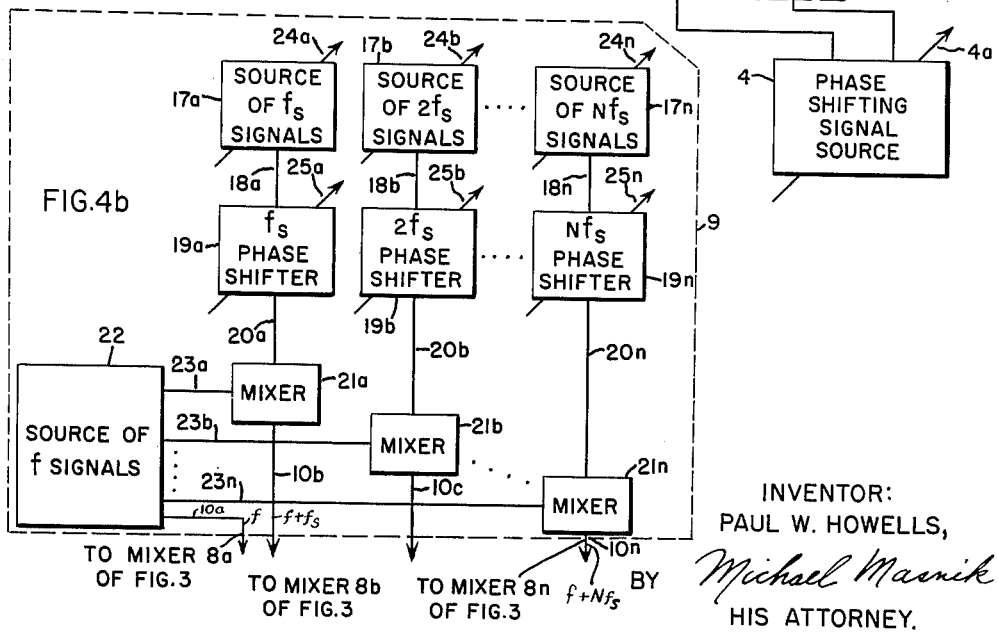

3,202,991
ELECTRONIC SCANNING OF LARGE ARRAYS
Paul W. Howells, Morrisville, N.Y., assignor to General
Electric Company, a corporation of New York
Filed Oct. 30, 1959, Ser. No. 851,189
4 Claims. (Cl. 343—100)

This invention relates to arrangements and methods for processing signal waves and particularly to arrangements and methods for modifying a plurality of waves having a first relative phase relationship to provide such waves with both a slow and rapidly varying relative phase relationship.

Oftentimes signal waves are received which have an undesirable relative phase relationship. It is sometimes more practical to alter or modify the existing relative phase relationships than to control the manner in which the waves are initially available. For example, it is sometimes desired to controllably, effectively vary the direction of directivity of an antenna or transducer array comprising a plurality of wave reception elements in order to preferentially receive waves from given directions. This amounts to obtaining the maximum wave energy from a wave source which has a given directional position with respect to the array. The maximum response axis of such a multi-element array can be changed to a different angle from the natural angle by mechanical movement of the transducer or by electrically changing the phase relationships between the elements of the transducer. Mechanical movement devices suffer from size, weight and complexity limitations. Existing electrical arrangements have proven to be unreliable and to exhibit frequency and other limitations.

It is therefore an object of this invention to provide an improved wave processing arrangement.

It is a further object of this invention to provide an arrangement for modifying waves having a first relative phase relationship to provide such waves with both a slow and rapidly time varying relative phase relationship.

Another object of this invention is to provide an improved electronic scanning of multi-element wave transducing arrays.

It is a further object of this invention to effectively provide an improved raster scan of the direction of directivity of a multi-element wave transducing array.

Briefly, one embodiment of this invention is directed to a uniform array of wave reception or transducing elements positioned on a rectangular grid coordinate pattern. A plurality of separately received electrical waves of common frequency and given relative phase available from these elements are processed to provide such waves with a relative phase relationship which may be controllably varied in both a slow and rapidly varying manner with time. The two-dimensional array is subdivided into a plurality of blocks of wave reception or transducing elements. The elements of any one block in combination provide a coarse wave transducing directivity pattern, whereas the elements of all of the blocks in combination provide a fine or narrow wave transducing directivity pattern. In order to identically phase steer the coarse patterns of each block of elements, means are provided for phase shifting the wave output of each element in each block in accordance with the relationship:

$$\theta ij = i\alpha + j\beta$$

where $\theta ij$ is the phase shift angle, $i$ and $j$ define the row and column position respectively of the element to be phase shifted, and $\alpha$ and $\beta$ define the two dimensional angular positions respectively of the beam, to provide a phase shifted output from each element. Means are provided for vectorially adding the waves of the elements of each block to provide a resultant or first output wave from each block. Here it should be noted that in order to identically steer the coarse patterns of all identical blocks, the phase shifts applied to corresponding elements of these blocks should be identical and therefore the phase commands to all blocks are identical. In order to scan said fine pattern at a given rate, there is provided a source of a plurality of frequency scanning signals, each having a fixed frequency difference from one another. Means are provided for mixing each of said scanning signals with a respective resultant block output to provide a mixed output for each block of elements and for vectorially adding all of said mixed outputs to provide a final or second output wave. The final output wave is effectively the output resulting from reception in a fine antenna beam pattern which beam pattern is raster scanned at a desired rate in a selected illuminated sector, which sector can be changed under the control of the operator.

The features of the present invention which are believed to be novel are set forth with particularity in the appended claims. This invention itself, however, both as to its organization and method of operation, together with further objects and advantages thereof, may best be understood by reference to the following description taken in connection with the accompanying drawings in which:

FIGS. 1a, 1b, and 1c illustrate schematically some basic principles useful in explaining the invention;

FIG. 3 illustrates in part schematic and in part block diagram form an arrangement for carrying out the invention; and FIGS. 4a and 4b illustrate in block diagram form details of the arrangement of FIG. 3.

Figure 1A:
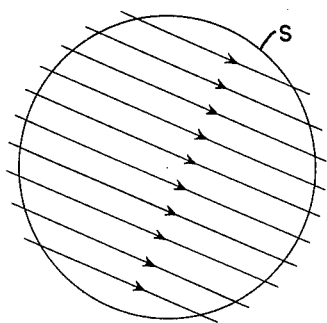

Referring to FIG. 1a, there is shown a sector of space S which it is desired to successively scan with a fine wave transducing beam in the manner shown by the arrows. In this manner the fine beam is caused to successively sweep or explore the entire sector.

Figure 1B:
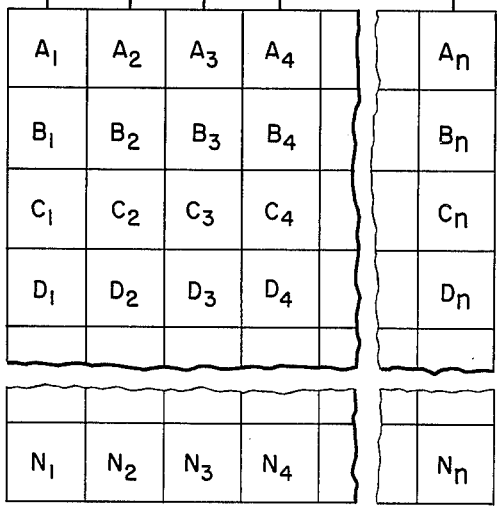

To accomplish this result, there is provided, as shown in FIG. 1b, a plurality of wave transducing elements positioned on a rectangular grid coordinate pattern. The arrangement of FIG. 1b, illustrates blocks of wave transducing elements in rows numbering to N and columns numbering to $n$.

Figure 1C:
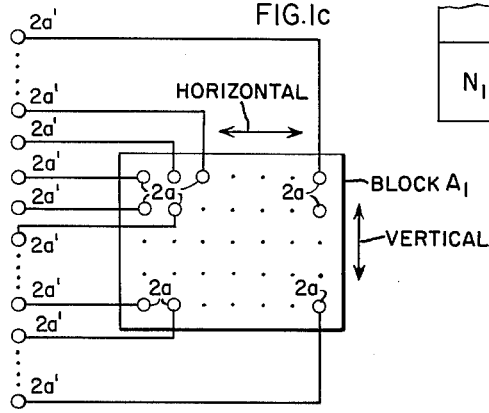

Referring to FIG. 1c, individual wave transducing elements of each block are shown with individual output leads coupling to terminals $2a'$. The individual elements may comprise dipoles, slots, etc. exhibiting the same broad directivity of say 90°. The elements of one of the blocks of elements, say block $A_1$ shown in FIG. 1c, acting in combination with components shown in block $1a$ of FIG. 3 exhibit a coarse wave directivity pattern, for example, of the order of 1°. It is known that a combination of blocks of elements as shown in FIG. 1b exhibit a much narrower wave directivity pattern, say of the order of $\frac{1}{10}°$. It is an object of this invention to steer the individual coarse beams associated with each of the blocks of elements to any desired two-coordinate polar angle position. It is also desired, after having attained this desired angular position, to effectively scan the 1° sector with a fine beam at a desired scanning rate and in a raster scan pattern.

Figure 2:
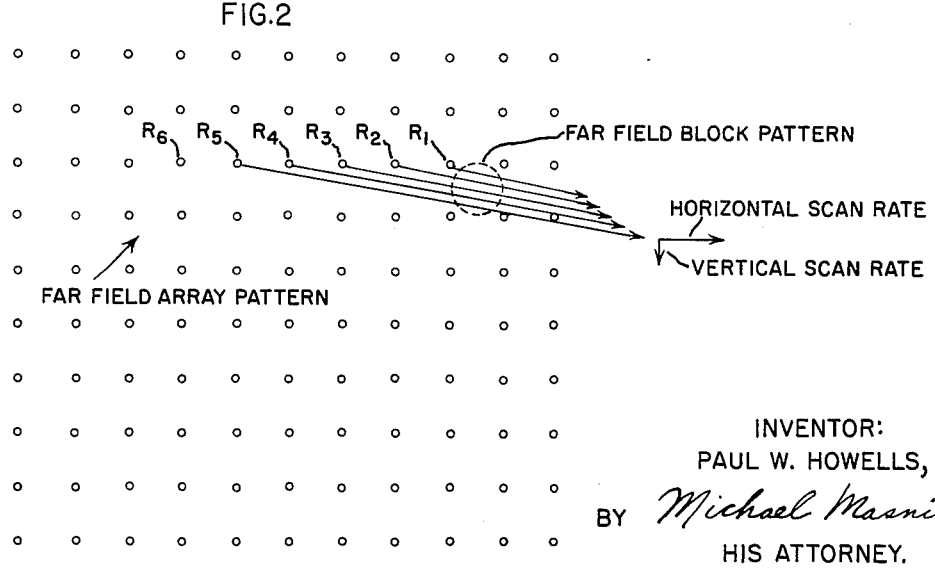
FIG. 2 illustrates schematically the manner in which a raster scan of a sector of space is obtained.

FIG. 2 is intended to illustrate in terms of the far field pattern of the described array the manner in which the scanning action described takes place. For this purpose the far field pattern of the array may be considered as being formed by the product of two patterns—first, the pattern which would be formed by the complete array assuming that the directive blocks of the array were replaced by relatively isotropic (non-directive) elements. This pattern would comprise a pin cushion of fine beams arranged in the grid pattern shown, and—secondly, the pattern of the block itself which is indicated as the circled coarse beam representing the illuminated sector of interest. When the array is composed of the directive blocks rather than the relatively isotropic elements, the net array pattern is the product of the two far field patterns shown so that in general only one of the fine beams comprising the pattern of the entire array is of any importance and that is the one which is in the sector of interest. The others which are outside of the sector of interest are suppressed by the directivity of the individual blocks. In operation the coarse patterns of the blocks would be identically phase steered to the sector of interest. When block signals are combined by the process illustrated in FIG. 3, the result is a rapid scanning of the array factor pattern of FIG. 2 which occurs, as shown by the vector diagram, rapidly in the horizontal direction and more slowly in the vertical direction so that the motion of all the fine beams of the array factor are to the right and slightly downward as illustrated. The result of this motion is that successive fine beams of the array factor pattern sweep out in turn the illuminated sector in what amounts to a television raster scan pattern. As illustrated in FIG. 2, the beam numbered $R_1$ would first scan through the top of the illuminated volume to be followed immediately by beam numbered $R_2$ which scans a line immediately below, $R_3$ immediately below that, etc. until one complete scan of the coarse block patterns have been explored sequentially by the fine beams of the array factor. Following this, the next row above of fine beams would repeat this scan pattern.

Referring to FIG. 3 there is illustrated one embodiment of the present invention adapted for effecting a raster scan of a desired sector of space by the directivity pattern of a multi-element wave transducing array. In particular, the arrangement of FIG. 3 operates to steer a coarse version of such directivity pattern to a desired sector and then to raster scan the area illuminated by the coarse pattern with a finely directive beam. In a particular transducing array such as, for example, individual wave transmission or reception elements laid out on a rectangular coordinate grid pattern comprising, for example, X rows and Y columns, individual elements are grouped into blocks as previously mentioned in connection with FIG. 1. These blocks as shown in FIG. 3 comprise blocks A1, B1 ... Nn and are coupled through terminals 2a', 2b' ... 2n' to other blocks shown as 1a, 1b ... 1n. Each blocks comprises the wave transducing elements shown as 2a, 2b ... 2n, where the individual elements 2a, for example, correspond to the individual elements shown in block $A_1$ of FIG. 1c. Each of the transducing elements 2a has associated with it a respective phase shifting circuit 3a as shown in detail in the block arrangement 1a of FIG. 3 and in FIG. 1c. There is provided at 4 a source of a plurality of phase shifting signals available on leads 5a, 5b ... 5n as shown. The relative value of phase shift available in the signals appearing on leads 5a, 5b ... 5n bears a direct relationship to the relative physical spacing of the elements available in each block 1a, 1b ... 1n of elements. Where the blocks are identical, as shown in FIG. 3, the same phase shift signals can be applied over terminals 5a, 5b ... 5n to each of the blocks. In the case where the transducing elements 2a are receiving a signal from a remote wave source making an azimuth angle of $\psi$ with the array, the wave portions received by each of the elements 2a are phase shifted in a respective phase shifter 3a in accordance with the phase shifting signals available on respective leads 5a, 5b ... 5n from the source of phase shifting signals 4. The purpose of the phase shifting signals is to steer the coarse directivity pattern, of say 1° beam width, associated with each of the blocks 1a, 1b ... 1n, to a desired direction angle. The angle selection is performed by means of a common control shown as the arrow 4a. The phase shifted received waves appear on the output leads 6a of block 1a, 6b of block 1b ... 6n of block 1n where they are vectorially added together by corresponding common output connections 7a, 7b ... 7n and applied to respective mixer circuits 8a, 8b ... 8n. On leads 7a, 7b ... 7n there appear resultant waves equivalent to waves having been received in individual 1° coarse directivity patterns and aimed at an angle $\psi$ under control of the steering control 4a. This is shown graphically by the diagram 9' positioned near the output lead 7a. The phase shifted vectorially added waves available from each block 1a, 1b ... 1n and available on respective output leads 7a, 7b ... 7n are applied to mixer circuits 8a, 8b ... 8n for mixing with frequency scanning signals available from source 9 on individual leads 10a, 10b ... 10n. As shown at output leads 10a, 10b ... 10n, the scanning signals for a particular row of blocks differ from one another by an integral multiple of a fixed difference frequency $f_s$. The mixed output from mixers 8a, 8b ... 8n appear on output leads 11a, 11b ... 11n respectively and are vectorially added in circuit 12 before application over output lead 13 to a utilization circuit 14. The resultant waves appearing on lead 13 are equivalent to the output received from a multi-element transducing array wherein a narrow or finely directive beam of say 1/10° beam width is raster scanned through the sector illuminated by the coarse or 1° beam shown at 9'. The scanning narrow or fine directive beam is shown graphically at 10'. Thus, by an arrangement of a plurality of isotropic or relatively isotropic wave transducing elements positioned in a rectangular grid coordinate pattern, applicant is able to electronically steer a relatively broad directive beam pattern to illuminate a sector of space and to raster scan the selected sector with a much narrower directive beam.

Referring to FIG. 4a, there is shown an arrangement for phase shifting the waves available from an individual element 2a under control of phase shifting signals available from a source 4 and for applying the phase shifted waves to an output lead 6a. Wherever possible, common reference numerals have been retained in FIG. 4a to correspond with those elsewhere in the drawings. The wave components available from each of the elements 2a are propagated through a separate waveguide 15 and modified in phase in passing a ferrite core 16 whose magnetic properties are modified in a well known manner by means of the signals in the control winding 17. The phase shifted waves are then combined and further processed as shown in FIG. 3. An additional phase shifter corresponding to 3a of FIG. 4a is provided in each block labeled 3a in FIG. 3 as well as in each block labeled 3b ... 3n of FIG. 3.

FIG. 4b represents block 9 of FIG. 3 and illustrates one manner in which frequency scanning signals may be provided. A plurality of different frequency signals are available from sources 17a, 17b ... 17n. It should be noted that the frequencies available on the respective output leads 18a, 18b ... 18n are related by the progression $f_s + 2f_s + nf_s$ which corresponds to the uniform spacing of the elements in the array. In general, the relative value of frequency bears a direct relation to the relative physical spacing of the blocks of elements. After appropriate phase shifting in respective phase shifters 19a, 19b ... 19n the different frequencies are applied over respective output leads 20a, 20b ... 20n to respective mixers 21a, 21b ... 21n where they are mixed with carrier frequency signals of frequency $f$ available from source 22 on respective output leads 23a, 23b ... 23n. The output $f$ is made available on lead 10a. The sums of the mixed signals are available as mixed outputs on leads 10b, 10c ,,, 10n and bear the desired relationships to one another to effect the frequency scanning desired. The frequency $f_s$ determines the effective rate of scan of the narrow beam through the sector defined by the coarse beam. Changes in the frequency $f_s$ shown schematically by the control arrows 24a, 24b . . . 24n change the rate of scan of the narrow beam. In the arrangement shown in FIG. 3, the phase shifters 19 are adjusted such that the signals appearing on 18a, 18b . . . 18n all pass through a maximum amplitude at the same time. Common changes in the phase shift angle effected by shifters 19, as for example shown diagrammatically by the control arrows 25a, 25b . . . 25n, change the position of the narrow beam in the sector defined by the coarse beam at some reference time. Relative changes in the phase shift angle effected by the individual shifters 19 cause a change in the shape of the narrow beam.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. A system for selecting a desired sector of space and for scanning said desired sector with a narrow wave directivity pattern comprising a plurality of equally spaced wave receptors each exhibiting a relatively broad wave directivity pattern, said receptors being grouped into a lesser plurality of identical blocks of wave receptors wherein each block exhibits a relatively narrow wave directivity pattern, means for directing said relatively narrow pattern to said desired sector comprising means for shifting the phases of the waves received by each receptor in accordance with the relative physical spacing of the receptors and the direction of said desired sector to produce respective phase shifted waves, means for vectorially adding said phase shifted waves of each block to produce a first resultant wave for each block, said groups of receptors being further arranged into an array exhibiting a still narrower wave directivity pattern, means for scanning said narrower pattern at a desired rate comprising means for frequency shifting each of said first resultant waves in accordance with the relative physical spacing of said blocks to produce respective frequency shifted waves, and means for vectorially adding said frequency shifted waves to produce a second resultant wave.

2. A system for selecting a desired sector of space and for investigating said sector with a narrow wave directivity pattern comprising a plurality of spaced wave transducers each exhibiting a relatively broad wave directivity pattern, said transducers being grouped into a lesser plurality of blocks of wave transducers where each block exhibits a relatively narrow wave directivity pattern, means for directing said relatively narrow pattern comprising means for shifting the phases of the waves received by each transducer in accordance with the relative physical spacing of the transducers and the angular direction of said sector to produce respective phase shifted waves, means for vectorially adding said phase shifted waves of each block to produce a first resultant wave for each block, said groups of transducers being further arranged into an array exhibiting a still narrower wave directivity pattern, means for directing said narrower pattern within said sector comprising means for frequency shifting each of said first resultant waves in accordance with the relative physical spacing of said blocks to produce respective frequency shifted waves, and means for vectorially adding said frequency shifted waves to produce a second resultant wave.

3. In combination, a source of a plurality of separate input waves of common frequency, said source comprising a corresponding plurality of wave transducing elements positioned in a two-dimensional array, said array being divided into a plurality of blocks of transducing elements, the elements of each block in combination providing a coarse wave transducing directivity pattern, the elements of all of the blocks in combination providing a fine wave transducing directivity pattern, means for identically phase steering the coarse patterns of each block of elements comprising means for phase shifting the wave output of each element in each block in accordance with the relationship $\theta ij = i\alpha + j\beta$ where $\theta ij$ represents the phase shift angle, $i$ and $j$ define the row and column position of the element to be phase shifted and $\alpha$ and $\beta$ define the two dimensional angular position of the beam to provide a phase shifted output from each element, means for vectorially adding the phase shifted output from each element of each block to provide a first resultant output signal for each block, means for scanning said fine pattern at a given rate comprising a source of a plurality of frequency scanning signals having a fixed frequency difference from one another, means for mixing each of said scanning signals with a respective first resultant output to provide a mixed output for each block of elements, means for vectorially adding said mixed outputs to provide a second resultant output, and means for utilizing said second resultant output.

4. In combination, a plurality of wave transducing elements positioned in a two-dimensional array, said array being divided into a plurality of blocks of transducing elements, the elements of each block in combination providing a coarse wave transducing directivity pattern, the elements of all of the blocks in combination providing a fine wave transducing directivity pattern, means for identically directing the coarse patterns of each block of elements comprising means for phase shifting the waves translated by each element in each block in accordance with the relationship $\theta ij = i\alpha + j\beta$ where $\theta ij$ represents the phase shifts angle, $i$ and $j$ define the row and column position of the element whose translated wave is to be phase shifted and $\alpha$ and $\beta$ define the two dimensional angular position of the coarse patterns to provide a phase shifted wave from each element, means for vectorially adding the phase shifted waves from each element of each block to provide a first resultant output signal for each block, means for directing said fine pattern comprising a source of a plurality of frequency scanning signals having a fixed frequency difference from one another, means for mixing each of said scanning signals with a respective first resultant output to provide a mixed output for each block of elements, means for vectorially adding said mixed outputs to provide a second resultant output, and means for utilizing said second resultant output.

References Cited by the Examiner

UNITED STATES PATENTS 2,245,660   6/41   Feldman et al. _____ 343—100.6
2,403,728   7/46   Loughren _____ 343—100.6

CHESTER L. JUSTUS, *Primary Examiner.*

KATHLEEN CLAFFY, *Examiner.*